(12) United States Patent
Jung et al.

(10) Patent No.: US 7,896,117 B2
(45) Date of Patent: Mar. 1, 2011

(54) BATTERY STORAGE DEVICE FOR VEHICLES AND FORKLIFT WITH THE SAME

(75) Inventors: Kun Uk Jung, Incheon (KR); Gyou Ryeon Chung, Seoul (KR)

(73) Assignee: Doosan Infracore Co., Ltd., Dong-Gu, Incheon (KR)

( * ) Notice: Subject to any disclaimer, the term of this patent is extended or adjusted under 35 U.S.C. 154(b) by 436 days.

(21) Appl. No.: 11/630,430

(22) Filed: Dec. 22, 2006

(65) Prior Publication Data
US 2008/0115990 A1  May 22, 2008

(51) Int. Cl.
*B60K 1/04* (2006.01)
(52) U.S. Cl. .................................... 180/68.5
(58) Field of Classification Search ............... 180/65.1, 180/68.5; 429/159
See application file for complete search history.

(56) References Cited

U.S. PATENT DOCUMENTS

| | | | | |
|---|---|---|---|---|
| 1,904,620 A * | 4/1933 | Kissinger | .................. | 180/68.5 |
| 2,257,155 A * | 9/1941 | Bowers | .................. | 180/68.5 |
| 2,933,548 A * | 4/1960 | Walker | .................. | 429/100 |
| 3,053,336 A * | 9/1962 | Zednik, Jr. | .................. | 180/68.5 |
| 3,704,761 A * | 12/1972 | Barrett, Jr. | .................. | 180/68.5 |
| 4,173,264 A * | 11/1979 | Erker et al. | .................. | 180/68.5 |
| 4,711,467 A * | 12/1987 | Link et al. | .................. | 280/785 |
| 4,723,618 A * | 2/1988 | Coonradt | .................. | 180/68.5 |
| 4,834,424 A * | 5/1989 | Link | .................. | 180/68.5 |
| 5,346,786 A * | 9/1994 | Hodgetts | .................. | 429/159 |
| 6,474,429 B1 * | 11/2002 | Nishio | .................. | 180/68.5 |
| 6,475,659 B1 * | 11/2002 | Heimer | .................. | 429/148 |

* cited by examiner

*Primary Examiner* — Frank B Vanaman
(74) *Attorney, Agent, or Firm* — Brouse McDowell; Heather M. Barne

(57) ABSTRACT

A battery storage device for forklifts is used in storing a battery. The battery storage device includes a vehicle frame having a battery storage room, a front support plate provided on the vehicle frame for supporting a front surface of the battery received in the battery storage room, a rear support plate provided at a rear side of the battery storage room for supporting a rear surface of the battery received in the battery storage room, the rear support plate detachably fixed to the vehicle frame in such a manner that, when detached, the rear support plate becomes movable toward or away from the front support plate in conformity with a size of the battery, and a position adjustor for position-adjustably fixing the rear support plate in one position selected from a plurality of fixing positions.

13 Claims, 4 Drawing Sheets

BATTERY STORAGE DEVICE FOR VEHICLES AND FORKLIFT WITH THE SAME

This application claims the benefit of the Korean Patent Application No. 10-2005-130208, filed on Dec. 27, 2005, the disclosure of which is hereby incorporated by reference as if fully set forth herein.

I. FIELD OF INVENTION

The present invention pertains to a battery storage device for vehicles and, more particularly, to a battery storage device for forklifts capable of stably storing a battery without due regard to the size thereof.

II. BACKGROUND OF THE INVENTION

Forklifts are used in raising, lowering or transporting cargos of heavyweight nature. Depending on the kinds of power sources employed, the forklifts may be classified into an engine-powered forklift and an electrically powered forklift, the latter of which produces little pollutant and hence is predominantly used in indoor areas.

The electrically powered forklift (hereinafter simply referred to as "forklift") is equipped with a battery for supplying an electric current to prime movers such as a travel motor, a fluid pump motor and the like.

Referring to FIG. 1 which shows a conventional battery storage device, a battery 20 of heavyweight nature is received within a battery storage room 12 of a vehicle frame 10. The battery storage room 12 has a side opening 12a through which the battery 20 is pushed into the battery storage room 12. In case the battery storage room 12 remains opened at its top, the battery 20 may be put into the battery storage room 12 through a top opening.

When received in the battery storage room 12, the battery 20 is brought into contact with and held in place by wall portions including a side wall 12b, a front support plate 30 and a rear support plate 40. In case the battery storage room 12 has a door 12c for closing and opening the side opening 12a as illustrated in FIG. 1, one side surface of the battery 20 may be supported by the door 12c.

Behind the rear support plate 40, there are arranged a travel motor 50 for driving rear wheels and a counterweight 52. The travel motor 50 and the counterweight 52 are fixed to the vehicle frame 10 to firmly support the battery 20. In this regard, the front support plate 30 and the rear support plate 40 are fixedly secured to the vehicle frame 10, for the purpose of which the front support plate 30 and the rear support plate 40 may be integrally formed with the vehicle frame 10 at the time of manufacturing the latter or may be welded to the vehicle frame 10.

In the meantime, the forklifts are graded according to a raising capability thereof. It may be said that the raising capability is proportional to a capacity of the battery 20 with which the forklift is equipped. The capacity of the battery 20 has something to do with a size, i.e., a length l of the battery 20 measured in a vehicle front-rear direction. In a nutshell, the electrically powered forklifts are differently graded depending on the size of the battery 20 required.

In order to assure cost-effective mass production, it is desirable that the forklifts are designed to share parts or components among similarly graded forklifts. As set forth above, however, the conventional forklift is not allowed to arbitrarily adjust the size of the battery storage room 12, meaning that, for storage of batteries differing in capacity, the length L of the battery storage room 12 measured in a vehicle front-rear direction should be changed by differently designing the vehicle frame 10. For this reason, the conventional forklift requires that the vehicle frame 10 should be differently designed on a vehicle grade basis in conformity with the size of the battery 20 required. This poses a problem in that the vehicle frame 10 cannot be shared among similarly graded forklifts, thus making it difficult to save production costs.

Furthermore, due to the fact that the battery storage room 12 is fixed in size as noted above, another problem arises in that, if a dimensional error occurs in production process or a battery standard is altered, the battery 20 cannot be received nor stably supported in the battery storage room 12.

III. SUMMARY OF THE INVENTION

In view of the above-noted problems inherent in the prior art, it is therefore an object of the present invention to provide a battery storage device for forklifts capable of stably supporting a battery under different circumstances.

Another object of the present invention is to provide a battery storage device for forklifts that allows similar kinds of forklifts to share a single vehicle frame, thereby saving production costs.

In order to accomplish the above objects, the present invention provides a battery storage device for vehicles for use in storing a battery within a vehicle, including: a vehicle frame having a battery storage room; a front support plate provided on the vehicle frame for supporting a front surface of the battery received in the battery storage room; a rear support plate provided at a rear side of the battery storage room for supporting a rear surface of the battery received in the battery storage room, the rear support plate detachably fixed to the vehicle frame in such a manner that, when detached, the rear support plate becomes movable toward or away from the front support plate in conformity with a size of the battery; and a position adjustor means for position-adjustably fixing the rear support plate in one position selected from a plurality of fixing positions.

IV. BRIEF DESCRIPTION OF THE DRAWINGS

The above and other objects, features and advantages of the present invention will be more clearly understood from the following detailed description taken in conjunction with the accompanying drawings, in which.

V. DESCRIPTION OF THE PREFERRED EMBODIMENT

Figure 1:
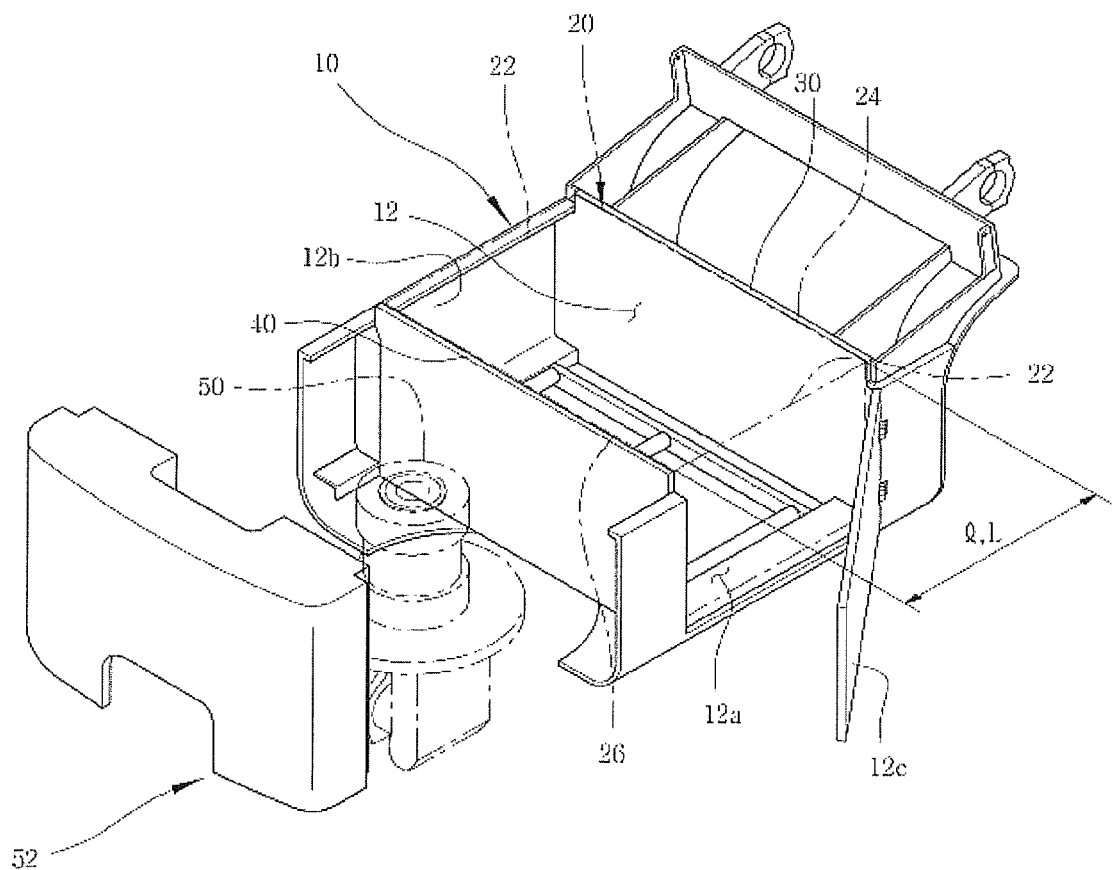
FIG. 1 is a rear perspective view showing a battery storage device employed in a prior art forklift.

Hereinafter, a battery storage device for forklifts according to a preferred embodiment of the present invention will be described in detail with reference to the accompanying drawings. The same parts or components as those of the prior art forklift mentioned earlier will be designated and described with like reference numerals.

Figure 2:
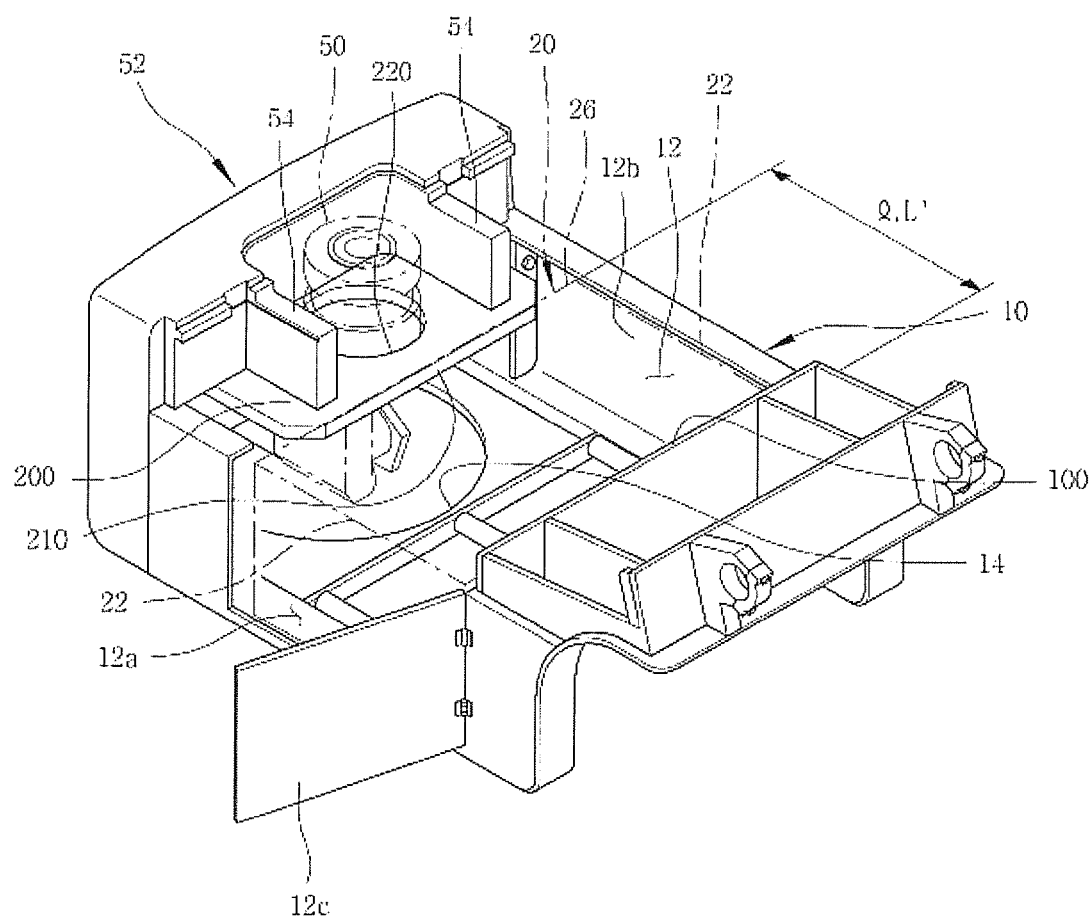
FIG. 2 is a front perspective view illustrating a battery storage device for forklifts in accordance with the present invention.
Figure 3:
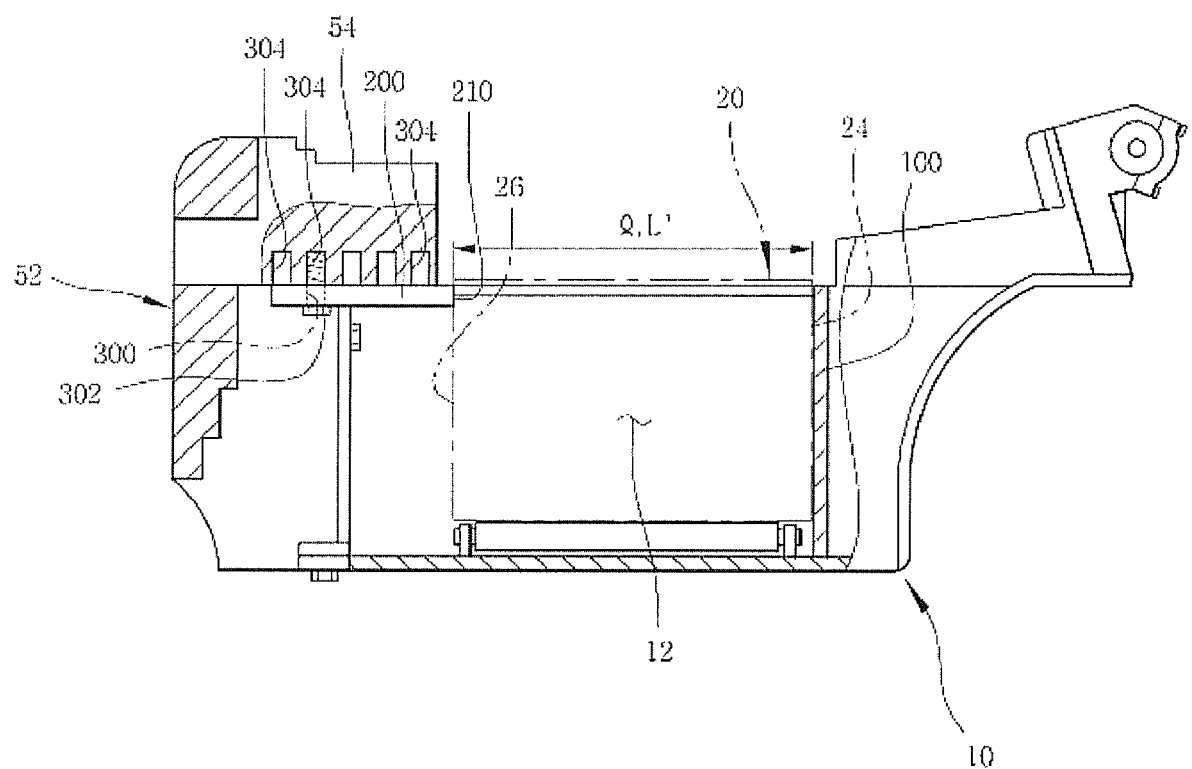
FIG. 3 is a side elevational section view of the battery storage device illustrated in FIG. 2.

Referring to FIGS. 2 and 3, a battery storage device for forklifts according to the present invention includes a vehicle frame 10 having a battery storage room 12 formed therein. The battery storage room 12 has an entrance through which a battery 20 is received or taken out. In the illustrated embodiment, the battery storage room 12 is provided, as the entrance, with an opening portion 12a formed at one of side walls 12b thereof. The opening portion 12a is openably closed by a door 12c.

The battery storage device further includes a front support plate 100 for supporting a front surface 24 of the battery 20 received within the battery storage room 12 and a rear support plate 200 for supporting a rear surface 26 of the battery 20.

The front support plate 100 is arranged in front of the battery storage room 12 and fixedly secured to the vehicle frame 10. The rear support plate 200 has a tip portion 210 and is installed in such a manner that the tip portion 210 is opposable to the front support plate 100 with the battery 20 left therebetween. In this connection, the rear support plate 200 extends along a counterweight 52 mounted to a tail end of the vehicle frame 10. In a broader meaning, the counterweight 52 is a part of the vehicle frame 10.

More specifically, the rear support plate 200 is removably attached to a pair of arms 54 of the counterweight 52 in a horizontal posture so that the tip portion 210 thereof can support the rear surface 26 of the battery 20. Preferably, the rear support plate 200 is arranged and sized such that, when the battery 20 is received in place, the rear support plate 200 can make contact with and support an upper center portion of the rear surface 26 of the battery 20. More preferably, the rear support plate 200 is adapted to support an uppermost portion of the rear surface 26 of the battery 20.

With the above construction, the front surface 24 and the rear surface 26 of the battery 20 received in the battery storage room 12 are reliably supported by the front support plate 100 and the rear support plate 200, whereby the battery 20 can be stably held within the battery storage room 12 against any undesired movement.

Although the rear support plate 200 is attached to the counterweight 52 in the illustrated embodiment of the present invention, it may be possible to directly attach the rear support plate 200 to the vehicle frame 10, if necessary.

Figure 4:
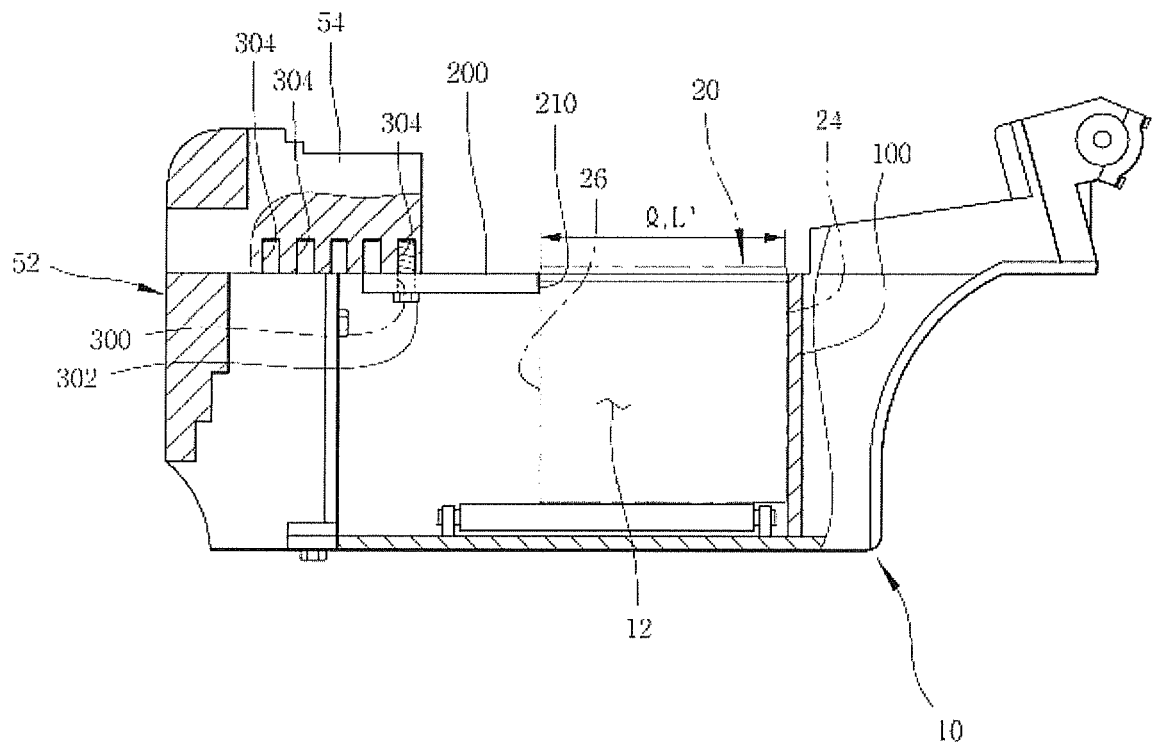
FIG. 4 is a view similar to FIG. 3 but showing the battery storage device with a rear support plate moved rearwards by position adjustment.

Referring to FIGS. 3 and 4, the battery storage device further includes a position adjustor means for changing an attachment position of the rear support plate 200 with respect to the front support plate 100.

In the illustrated embodiment, the position adjustor means is comprised of a through-hole 300 formed in the rear support plate 200, a plurality of fixing holes 304 formed in the counterweight 52 substantially at an equal interval and a fixing bolt 302 inserted through the through-hole 300 of the rear support plate 200 and threadedly engaged with one of the fixing holes 304.

The fixing holes 304 are arranged in a row in a vehicle length direction with respect to the front support plate 100. Thus, the position of the rear support plate 200 is arbitrarily adjusted depending on which fixing holes 304 the fixing bolt 302 is engaged with. The spatial distance L' between the front support plate 100 and the rear support plate 200 is changed by adjusting the position of the rear support plate 200 in this manner. Although the fixing holes 304 are illustrated in the drawings as if they are formed in a single row, it should be noted that the fixing holes 304 are provided in two rows in a one-to-one correspondence to the arms 54 of the counterweight 52.

With the position adjustor means of the construction stated above, it is possible to adjust the spatial distance L' between the front support plate 100 and the rear support plate 200 in conformity with the front-rear width λ of the battery 20 received within the battery storage room 12, as illustrated in FIGS. 3 and 4.

Accordingly, the front support plate 100 and the rear support plate 200 are able to stably support the front surface 24 and the rear surface 26 of the battery 20 without regard to the size of the battery 20, thereby eliminating the need to provide varying sizes of battery storage rooms on a battery size basis.

Referring to FIG. 2, an installation aperture 220 is formed in the rear support plate 200 that extends in a horizontal direction. A travel motor 50 for driving a rear wheel (not shown) is fitted in place through the installation aperture 220. The travel motor 50 is energized by an electric current of the battery 20 and is operatively connected to the rear wheel through a power transmission device (not shown).

If the travel motor 50 is mounted in this manner, the mounting position of the travel motor 50 needs to be changed upon displacement of the rear support plate 200. This also entails a necessity for changing the structure of the power transmission device. However, the power transmission device is to be differently designed on a vehicle-by-vehicle basis for adjustment of vehicle performance characteristics, such as a gravity center and the like, which vary with the kind of forklift. Examples of an element involved in adjustment of the performance characteristics include the vehicle frame 10, the battery 20 and the counterweight 52. In any case, the power transmission device is doomed to be differently designed depending on the kind of forklift, which means that there is no need to make a special change in structure of the power transmission device as compared to the prior art.

On the contrary, there is provided an advantageous effect that production costs can be saved by sharing a single type of vehicle frame among different forklifts. In this regard, it is to be noted that a cutout 14 is formed in a floor of the vehicle frame 10. Preferably, the cutout 14 has such a size as to assure ease with which the position of the travel motor 50 can be changed. This helps different kinds of forklifts to share a single type of vehicle frame.

Next, description will be given to an exemplary use of the battery storage device for forklifts configured as above.

First of all, the vehicle frame 10 is prepared in a prior manufacturing process and the counterweight 52 is fixedly secured to the vehicle frame 10.

Once the counterweight 52 has been secured, the position of the rear support plate 200 is adjusted to conform to the front-rear width λ of the battery 20 which is to be received within the battery storage room 12.

Upon completion of position adjustment of the rear support plate 200, the fixing bolt 302 is inserted through the through-hole 300 of the rear support plate 200 and then threadedly engaged with one of the fixing holes 304 of the counterweight 52 which remains in alignment with the through-hole 300.

Thus, the rear support plate 200 is fixedly attached to the counterweight 52 in such a manner that the tip portion 210 thereof is kept spaced apart from the front support plate 100 by a predetermined distance, i.e., a spatial distance L' corresponding to the front-rear width λ of the battery 20.

After the rear support plate 200 has been fixed in place, the travel motor 50 for driving the rear wheel is fixedly secured to the installation aperture 220. Thus, the battery storage device for forklifts comes into a state that it can stably receive a battery of a specified size required in a specified kind of forklift, whereby the battery 20 can be stably held within the battery storage room 12 against any undesired movement.

As fully described hereinabove, the battery storage device for forklifts in accordance with the present invention is capable of stably storing batteries of varying sizes. This is because the spatial distance between a front support plate and a rear support plate can be adjusted in conformity with a front-rear width of a specified battery.

Thanks to the fact that batteries of varying sizes can be stably stored, there is no need to differently design the size of a battery storage room on a vehicle kind basis even if the size of a battery required differs from vehicle to vehicle. This helps to remove difficulties involved in differently manufacturing a vehicle frame on a vehicle kind basis.

Since batteries of varying sizes can be stored without having to differently manufacture a vehicle frame on a vehicle kind basis, it becomes possible to increase a part sharing ratio among different forklifts, which leads to an advantageous effect that production costs can be saved through the share of major parts.

While the invention has been described in respect of one preferred embodiment, it will be understood by those skilled in the art that the present invention is not limited to the foregoing embodiment but various changes and modifications may be made without departing from the scope of the invention as defined in the claims.

What is claimed is:

1. A forklift including a battery storage device for storing a battery, the battery storage device comprising:
   a vehicle frame having a battery storage room;
   a front support plate provided on the vehicle frame for supporting a front surface of the battery received in the battery storage room, wherein the front support plate is positioned a fixed distance from a rear portion of the vehicle frame;
   a counterweight coupled to the vehicle frame and placed apart from the front support plate in a fixed length;
   a rear support plate provided at a rear side of the battery storage room for supporting a rear surface of the battery received in the battery storage room, a portion of the rear surface of the battery in contact with the rear support plate extending substantially perpendicular to the rear support plate, the rear support plate detachably fixed to the rear portion of the vehicle frame in such a manner that, when detached, the rear support plate becomes movable toward or away from the front support plate in conformity with a size of the battery; and
   a rear wheel, a travel motor mounted to the rear support plate for producing power to drive the rear wheel, the vehicle frame having a cutout through which a power transmission device extends toward the travel motor, the cutout being of such a size as to allow the travel motor to move together with the rear support plate.

2. The forklift as recited in claim 1, further comprising a position adjustor means for position-adjustably fixing the rear support plate in one position selected from a plurality of fixing positions.

3. The forklift as recited in claim 2, wherein counterweight is arranged at the rear side of the battery storage room, the rear support plate being fixed to the counterweight.

4. The forklift as recited in claim 3, wherein the counterweight is provided with a pair of arms extending in parallel with the movement direction of the rear support plate, a plurality of fixing holes being formed in the arms.

5. The forklift as recited in claim 2, wherein the rear support plate is adapted to support the rear surface of the battery in a portion higher than a center portion of the rear surface.

6. A battery storage device for storing a battery, the battery storage device comprising:
   a vehicle frame having a battery storage room;
   a front support plate provided on the vehicle frame for supporting a front surface of the battery received in the battery storage room;
   a rear support plate provided at a rear side of the battery storage room for supporting a rear surface of the battery received in the battery storage room, the rear support plate detachably fixed to the vehicle frame in such a manner that, when detached, the rear support plate becomes movable toward or away from the front support plate in conformity with a size of the battery; and
   a position adjustor means for position-adjustably fixing the rear support plate in one position selected from a plurality of fixing positions,
   wherein the position adjustor means includes a through-hole formed in the rear support plate, a plurality of fixing holes formed in the vehicle frame at the rear side of the battery storage room and a fixing bolt inserted through the through-hole and engaged with one of the fixing holes,
   wherein the fixing holes are arranged in a row along a movement direction of the rear support plate,
   wherein the rear support plate is movable to one of the fixing positions and fixed in place by engagement of the fixing bolt with one of the fixing holes,
   wherein the vehicle frame includes a counterweight arranged at the rear side of the battery storage room, the rear support plate being fixed to the counterweight,
   and wherein the counterweight is provided with a pair of arms extending in parallel with the movement direction of the rear support plate, the fixing holes being formed in the arms.

7. A forklift including a battery storage device for storing a battery, the battery storage device comprising:
   a vehicle frame having a battery storage room;
   a front support plate provided on the vehicle frame for supporting a front surface of the battery received in the battery storage room;
   a rear support plate provided at a rear side of the battery storage room for supporting a rear surface of the battery received in the battery storage room, the rear support plate detachably fixed to the vehicle frame in such a manner that, when detached, the rear support plate becomes movable toward or away from the front support plate in conformity with a size of the battery; and
   a position adjustor means for position-adjustably fixing the rear support plate in one position selected from a plurality of fixing positions,
   wherein the position adjustor means includes a through-hole formed in the rear support plate, a plurality of fixing holes formed in the vehicle frame at the rear side of the battery storage room and a fixing bolt inserted through the through-hole and engaged with one of the fixing holes,
   wherein the fixing holes are arranged in a row along a movement direction of the rear support plate,
   wherein the rear support plate is movable to one of the fixing positions and fixed in place by engagement of the fixing bolt with one of the fixing holes,
   wherein the vehicle frame includes a counterweight arranged at the rear side of the battery storage room, the rear support plate being fixed to the counterweight,
   and wherein the counterweight is provided with a pair of arms extending in parallel with the movement direction of the rear support plate, the fixing holes being formed in the arms.

8. A battery storage device for vehicles for use in storing a battery within a vehicle, comprising:

a vehicle frame having a battery storage room;
a front support plate provided on the vehicle frame for supporting a front surface of the battery received in the battery storage room, a rear portion of the vehicle frame being placed from the front support plate in a fixed length;
a rear support plate provided at a rear side of the battery storage room for supporting a rear surface of the battery received in the battery storage room, the rear support plate detachably fixed to the rear portion of the vehicle frame in such a manner that, when detached, the rear support plate becomes movable toward or away from the front support plate in conformity with a size of the battery; and
a position adjustor means for position-adjustably fixing the rear support plate in one position selected from a plurality of fixing positions, wherein the position adjustor means includes a through-hole formed in the rear support plate, a plurality of fixing holes formed in the vehicle frame at the rear side of the battery storage room and a fixing bolt inserted through the through-hole and engaged with one of the fixing holes,
wherein the fixing holes are arranged in a row along a movement direction of the rear support plate,
and wherein the rear support plate is movable to one of the fixing positions and fixed in place by engagement of the fixing bolt with one of the fixing holes,
wherein the vehicle frame includes a counterweight arranged at the rear side of the battery storage room, the rear support plate being fixed to the counterweight.

9. The battery storage device for vehicles as recited in claim 8, wherein the counterweight is provided with a pair of arms extending in parallel with the movement direction of the rear support plate, the fixing holes being formed in the arms.

10. A forklift including a battery storage device for storing a battery, the battery storage device comprising:
a vehicle frame having a battery storage room;
a front support plate provided on the vehicle frame for supporting a front surface of the battery received in the battery storage room, wherein the front support plate is positioned a fixed distance from a rear portion of the vehicle frame;
a rear support plate provided at a rear side of the battery storage room for supporting a rear surface of the battery received in the battery storage room, the rear support plate detachably fixed to the rear portion of the vehicle frame in such a manner that, when detached, the rear support plate becomes movable toward or away from the front support plate in conformity with a size of the battery; and
a position adjustor means for position-adjustably fixing the rear support plate in one position selected from a plurality of fixing positions,
wherein the position adjustor means includes a through-hole formed in the rear support plate, a plurality of fixing holes formed in the vehicle frame at the rear side of the battery storage room and a fixing bolt inserted through the through-hole and engaged with one of the fixing holes,
wherein the fixing holes are arranged in a row along a movement direction of the rear support plate,
wherein the rear support plate is movable to one of the fixing positions and fixed in place by engagement of the fixing bolt with one of the fixing holes, and
wherein the vehicle frame includes a counterweight arranged at the rear side of the battery storage room, the rear support plate being fixed to the counterweight.

11. The forklift as recited in claim 10, wherein the counterweight is provided with a pair of arms extending in parallel with the movement direction of the rear support plate, the fixing holes being formed in the arms.

12. A forklift including a battery storage device for storing a battery, the battery storage device comprising:
a vehicle frame having a battery storage room;
a front support plate provided on the vehicle frame for supporting a front surface of the battery received in the battery storage room;
a rear support plate provided at a rear side of the battery storage room for supporting a rear surface of the battery received in the battery storage room, the rear support plate detachably fixed to the vehicle frame in such a manner that, when detached, the rear support plate becomes movable toward or away from the front support plate in conformity with a size of the battery;
a position adjustor means for position-adjustably fixing the rear support plate in one position selected from a plurality of fixing positions;
a rear wheel;
a travel motor mounted to the rear support plate for producing power to drive the rear wheel and
a power transmission device for transferring the power of the travel motor to the rear wheel, the vehicle frame having a cutout through which a power transmission device extends toward the travel motor, the cutout being of such a size as to allow the travel motor to move together with the rear support plate.

13. A forklift including a battery storage device for storing a battery, the battery storage device comprising:
a vehicle frame having a battery storage room;
a front support plate provided on the vehicle frame for supporting a front surface of the battery received in the battery storage room, wherein the front support plate is positioned a fixed distance from a rear portion of the vehicle frame;
a counterweight coupled to the vehicle frame and placed apart from the front support plate in a fixed length; and
a rear support plate provided at a rear side of the battery storage room for supporting a rear surface of the battery received in the battery storage room, the rear support plate detachably fixed to the rear portion of the vehicle frame in such a manner that, when detached, the rear support plate becomes movable toward or away from the front support plate in conformity with a size of the battery;
a rear wheel; and,
a travel motor mounted to the rear support plate for producing power to drive the rear wheel, the vehicle frame having a cutout through which a power transmission device extends toward the travel motor, the cutout being of such a size as to allow the travel motor to move together with the rear support plate.

* * * * *